United States Patent [19]

Harris et al.

[11] Patent Number: 4,735,765

[45] Date of Patent: Apr. 5, 1988

[54] FLEXIBLE HELICAL-AXIS STELLARATOR

[75] Inventors: Jeffrey H. Harris, Oak Ridge, Tenn.; Timothy C. Hender, Abingdon, England; Benjamin A. Carreras, Oak Ridge, Tenn.; Jack L. Cantrell, Oak Ridge, Tenn.; Robert N. Morris, Oak Ridge, Tenn.

[73] Assignee: The United States of America as represented by the United States Department of Energy, Washington, D.C.

[21] Appl. No.: 801,894

[22] Filed: Nov. 26, 1985

[51] Int. Cl.$^4$ .............................................. G21B 1/00
[52] U.S. Cl. ..................................... 376/142; 376/133
[58] Field of Search ......................... 376/121, 133, 142

[56] References Cited

U.S. PATENT DOCUMENTS 3,278,384 10/1966 Lenard et al. ...................... 376/133
3,433,705 3/1969 Cornish ............................... 376/142

OTHER PUBLICATIONS

Boozer et al., "Two High-$\beta$ Toroidal Config.: A Stellarator and a Tokamak–Torsatron Hybrid", Plasma Physics & Controlled Nuclear Fusion Research, vol. 3, IEAE, Vienna, 1983, pp. 129–139.
Zueva et al., "Spiral Magnetic Configurations with Minimum $\bar{B}$, Plasma Physics, vol. 8, pp. 765–774, 1966.
Yoshikawa, "Design of Helical Axis Stellarator", Nuclear Fusion, vol. 23, No. 5, pp. 667–669, 1983.

Primary Examiner—David H. Brown
Assistant Examiner—Richard L. Klein
Attorney, Agent, or Firm—David E. Breeden; Stephen D. Hamel; Judson R. Hightower

[57] ABSTRACT

An $l=1$ helical winding which spirals about a conventional planar, circular central conductor of a helical-axis stellarator adds a significant degree of flexibility by making it possible to control the rotational transform profile and shear of the magnetic fields confining the plasma in a helical-axis stellarator. The toroidal central conductor links a plurality of toroidal field coils which are separately disposed to follow a helical path around the central conductor in phase with the helical path of the $l=1$ winding. This coil configuration produces bean-shaped magnetic flux surfaces which rotate around the central circular conductor in the same manner as the toroidal field generating coils. The additional $l=1$ winding provides flexible control of the magnetic field generated by the central conductor to prevent the formation of low-order resonances in the rotational transform profile which can produce break-up of the equilibrium magnetic surfaces. Further, this additional winding can deepen the magnetic well which together with the flexible control provides increased stability.

2 Claims, 7 Drawing Sheets

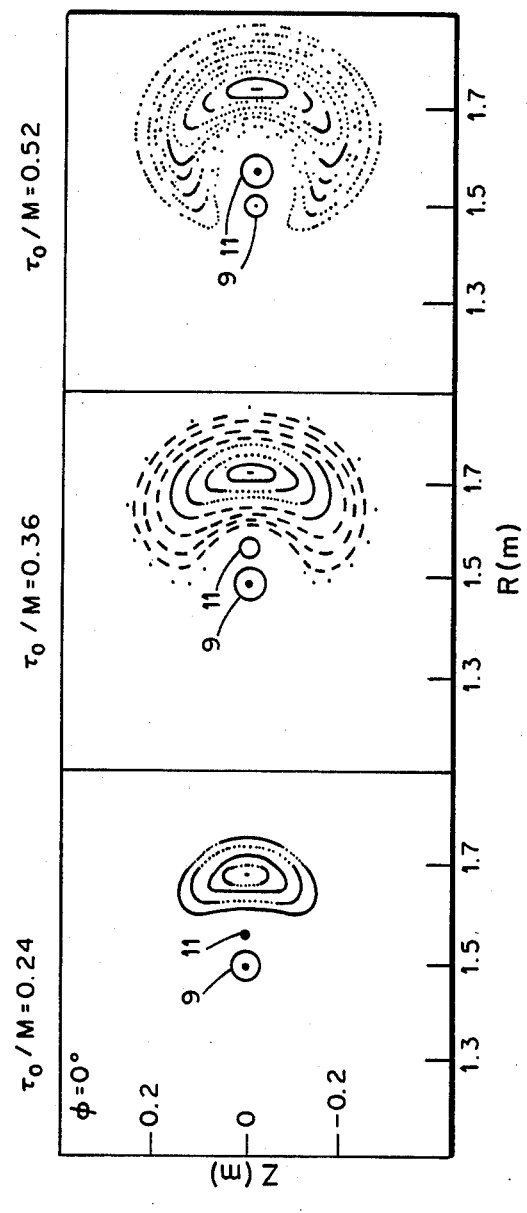

FLEXIBLE HELICAL-AXIS STELLARATOR

BACKGROUND OF THE INVENTION

This invention is a result of a contract with the U.S. Department of Energy. It relates generally to the family of stellarator type magnetic fusion devices and more specifically to improvements in helical-axis (heliac) stellarators.

A fusion reactor based on magnetic confinement of the fusion plasma will be cost effective if beta ($\beta$), the ratio of the plasma kinetic pressure to the pressure of the confining magnetic field, is large enough (5 to 8%) and the plasma particles and energy confinement time is long enough. The stellarator type device is one candidate presently being developed toward this goal. Toroidal confinement devices that use coils external of the plasma to generate all of the magnetic fields required to produce closed magnetic surfaces for plasma confinement are referred to generically as stellarators. The principle advantage shared by all stellarator configurations is that they offer the prospect of steady-state operation without plasma current. This eliminates a major driving force for plasma instabilities and the need for current drive.

Stellarators with helical magnetic axes (heliacs) have been shown to be theoretically capable of stably confining plasmas with betas higher than 10%. Therefore, they could become an attractive fusion reactor concept. However, limitations on the achievable beta are expected for finite aspect ratio configurations, where the aspect ratio is the ratio of the major radius (R) of the toroid to the plasma radius (a) confined within the toroid. Studies of finite-aspect ratio, three-dimensional (3-D) MHD equilibria have shown that the growth of finite plasma-pressure-induced field harmonics resonant at rational values of the magnetic rotational transform can lead to the formation of large magnetic islands in the confinement fields. These islands break up the equilibrium flux surfaces at low beta values, which would lead to a significant deterioration of plasma confinement. Similar effects have already been observed for $\beta<1\%$ in the circular-axis, low-shear Wendelstein VIIA Stellarator at Garching, West Germany, which has a fairly low rotational transform per period ($\tau/M \approx 0.1$). Heliac configurations typically have higher values of $\rho/M \gtrsim 0.3$; this greatly increases the number and strength of the potential low order resonances. Thus, there is a need for a means of controlling the rotational transform profile in a heliac device in order to explore, and ultimately avoid, these resonances.

SUMMARY OF THE INVENTION

In view of the above need, it is an object of this invention to provide a means for maintaining 3-D MHD equilibrium in a helical-axis stellarator.

Another object of this invention is to provide an improved helical-axis stellarator wherein the magnetic rotational transform and shear may be controlled within a substantial range of flexibility.

Further, it is an object of this invention to provide an improved helical-axis stellarator as in the above objects which has an additional improvement of a deeper magnetic well.

Additional objects, and novel features of the invention will be apparent from the description which follows taken in conjunction with the drawings.

To achieve the foregoing and other objects and in accordance with the present invention, an improved helical-axis stellarator is provided in which an $l=1$ winding is helically disposed about the conventional central circular planar toroidal winding of the heliac stellarator configuration; this winding revolves in phase with the helical path of a plurality of planar toroidal field generating coils disposed about the central circular conductor to form a helical-axis toroidal magnetic confinement field in which a significant degree of flexibility in controlling the rotational transform profile and shear is obtained. Such control is essential in avoiding the break-up of the equilibrium magnetic surfaces, which limit the beta achievable at finite aspect ratios. The use of the additional $l=1$ winding also permits reduction of the total central conductor current and deepens the magnetic well.

BRIEF DESCRIPTION OF THE DRAWINGS

FIG. 4 is a graph of three different flux surface cross-sections corresponding to three different values of $\tau_o/M$.

$a_{hc}=5.25$ cm, $I_{cc}=200$ kA, $I_{hc}=140$ kA;
$a_{hc}=7.0$ cm, $I_{cc}=219$ kA, $I_{hc}=95$ kA; and
$a_{hc}=8.75$ cm, $I_{cc}=200$ kA, $I_{hc}=60$ kA.

Figure 7:
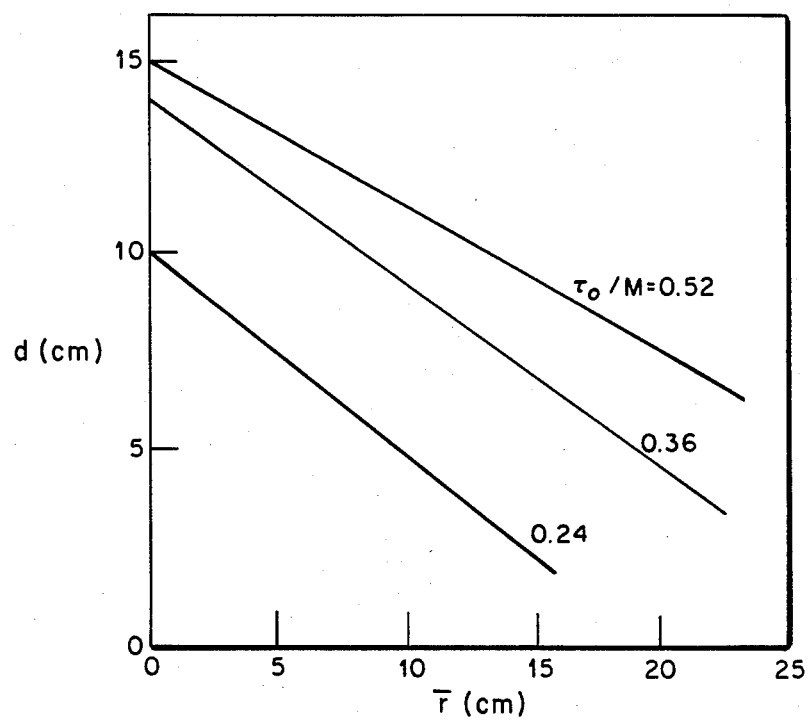

FIG. 7 is a plot which shows the minimum distance (d) from each flux surface to the center of the helical hardcore winding for configurations having three values of $\tau_o/M$. The flux surfaces are labeled by their average radii.

Figure 1:
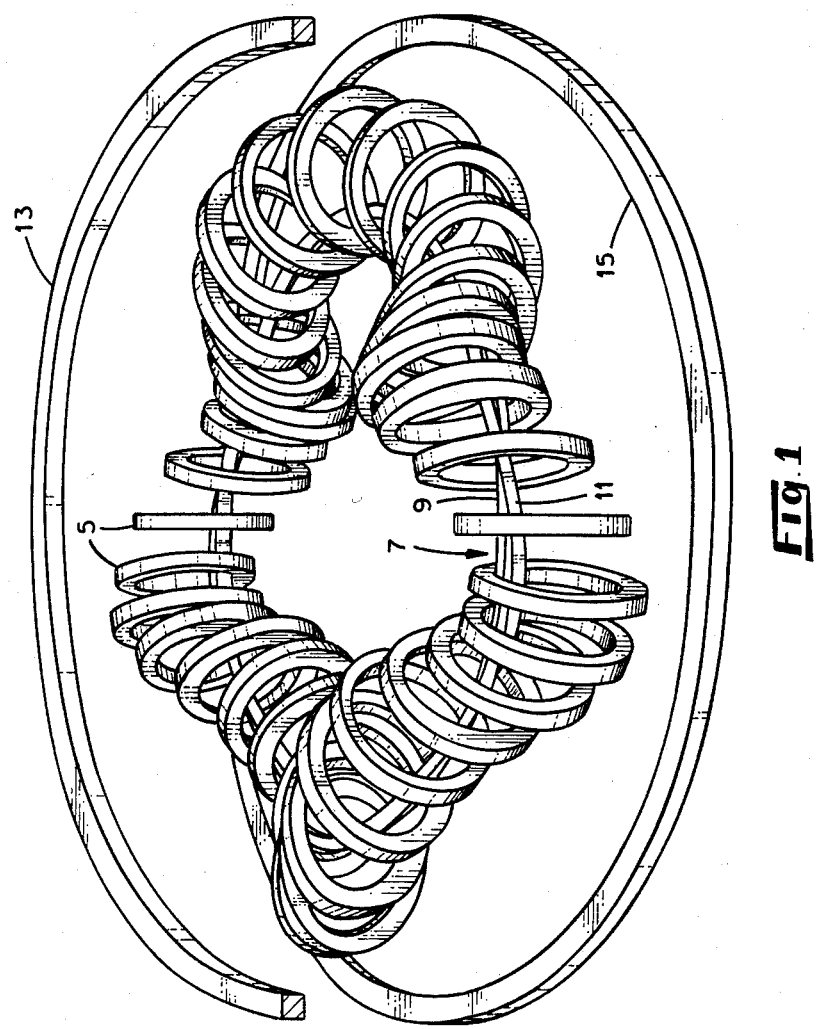
FIG. 1 is a schematic diagram of the coil system of a four period (M=4) flexible helical-axis stellarator according to the present invention.
Figure 8:
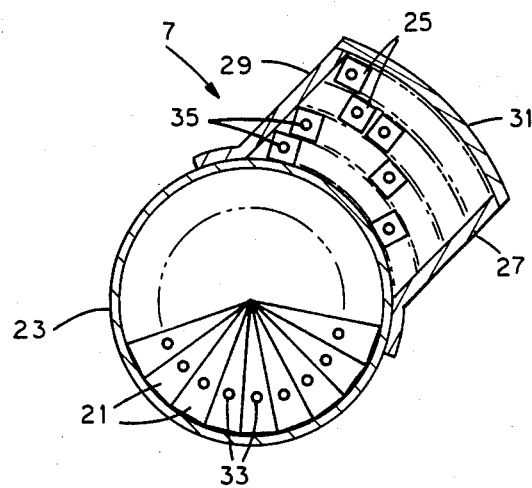

FIG. 8 is a cross-sectional view of one embodiment of the composite hardcore winding 7 of FIG. 1.

Figure 9:
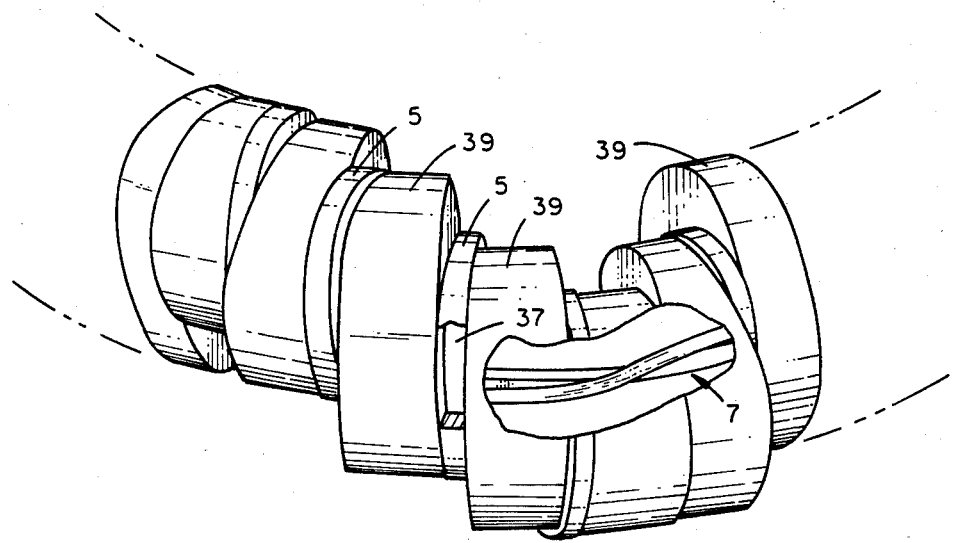

FIG. 9 is a perspective view of a partial section (approximately 1 helical field period) of a vacuum vessel embodiment which is located internal of the TF coils 5 of FIG. 1.

Figure 10:
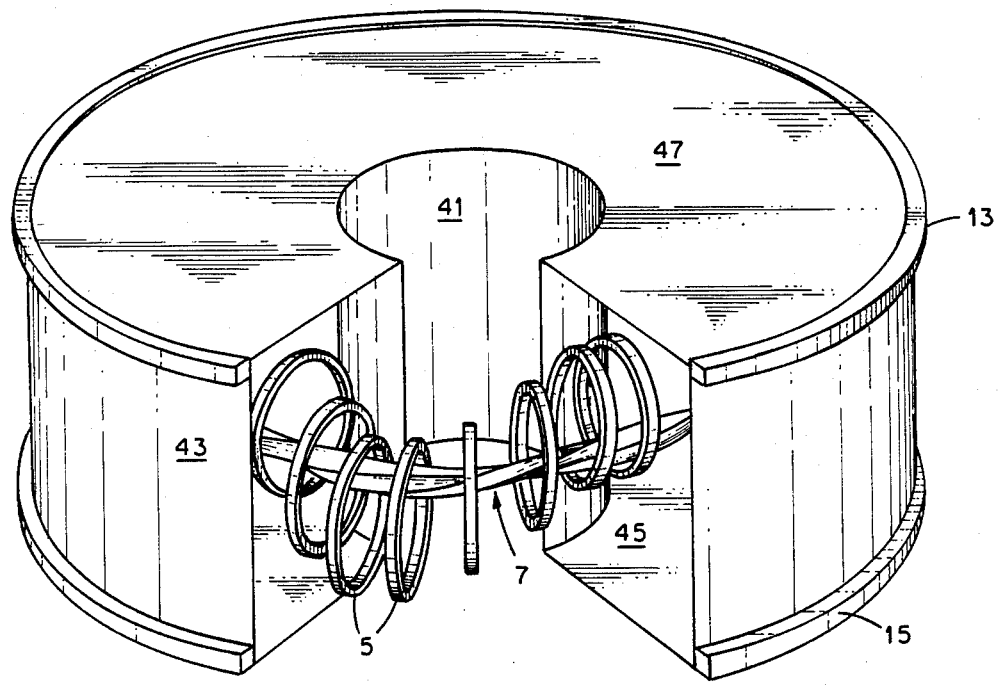

FIG. 10 is a perspective view with portions removed of of a vacuum vessel embodiment which is located external of the TF coils 5.

DETAILED DESCRIPTION OF THE INVENTION

Referring now to FIG. 1, there is shown the windings for a four-period (M=4) helical-axis stellarator (heliac) incorporating the improvement according to the present invention to provide a flexible heliac configuration in which it is made possible to vary the principle plasma confinement configuration characteristic, i.e., the magnetic field rotational transform and shear, to provide confinement with finite beta values ranging from a low beta value of zero to high beta values ≳5–10%. The M=4 configuration consists of 32 toroidal field (TF) coils 5 which are helically disposed about a composite hardcore winding 7. The TF coils 5 are planar, circular windings whose centers are on the axis of a toroidal helix twisting about a planar toroidal winding 9, which in a conventional heliac forms the central linking conductor for the TF coils. It will be understood by those skilled in the art that the TF coils may also be formed of shapes different than circular conductors. For example, the TF coils may also be formed of planar rectangular coils.

In the example shown in FIG. 1, the TF coils form a toroidal helix having a major radius $R_o=1.5$ meters, minor radius $r_{sw}=0.28$ meter and a winding law $\theta=4\phi$, where $\theta$ and $\phi$ are the usual poloidal and toroidal angles, respectively. The composite hardcore winding 7 is comprised of two components, the planar circular coil 9 located at the minor axis and an $l=1$ helical winding 11 that follows the same winding law as do the TF coils, but with a smaller minor radius $a_{hc}$. These are separate windings (9 and 11), in which the current may be controlled separately, thus providing the improvement in confinement which is the basis of this invention. This central winding configuration provides flexibility in the design and operation of a heliac and thus differentiates it from the conventional heliac.

In addition to these windings, two outboard, circular vertical field (VF) coils 13 and 15, located above and below the helical axis torus, provide the required vertical field components to properly locate the magnetic axis of the plasma confining flux surfaces. These coils add vertical magnetic fields equal to about 5% of the toroidal field strength produced by the TF coils 5, which in the illustrated devices is about 1 Tesla.

Figure 2:
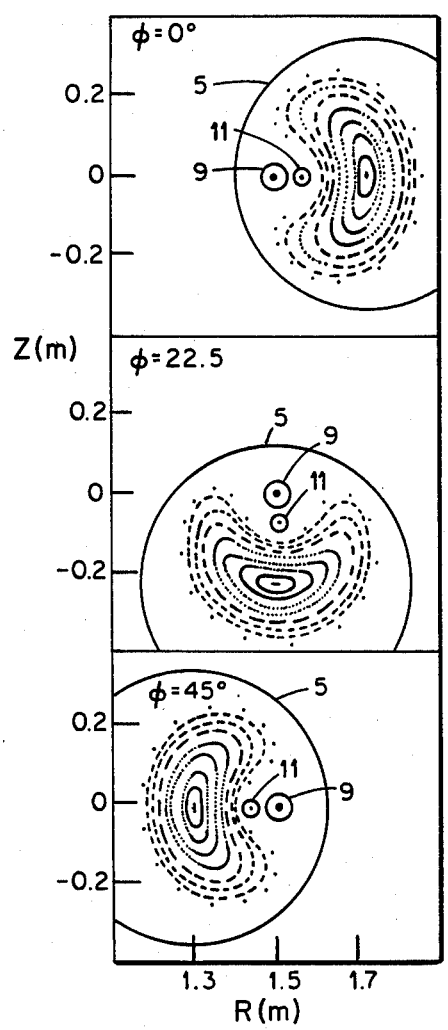
FIG. 2 is a graph of magnetic flux surface cross-sections at three toroidal angles ($\phi$) about the helical torus for configurations with $\tau_o=1.46$, where $\tau_o$ is the central rotational transform.

FIG. 2 shows plots of a typical set of magnetic surfaces which may be obtained in the flexible heliac shown in FIG. 1 together with the relative locations of the central conductors 9 and 11 and the corresponding location TF coils 5 for a portion of one helical period. As best seen in this Figure, the nested plasma confining flux surfaces are bean-shaped and are formed within the TF coils and rotate poloidally about the planar conductor 9 located on the major radius (R=1.5 m) with the helically wound coil 11 in phase with the helical path of the TF coil 5 centers so that the indentation in the bean-shaped flux surfaces are always adjacent the helical winding 11 as the two spiral about the central axis conductor 9. The helical winding 11 makes one revolution about the central axis conductor in one helical field period of the helical torus. The magnetic axis remains reasonably close to the TF coil centers as they rotate about the hardcore.

Figure 3:
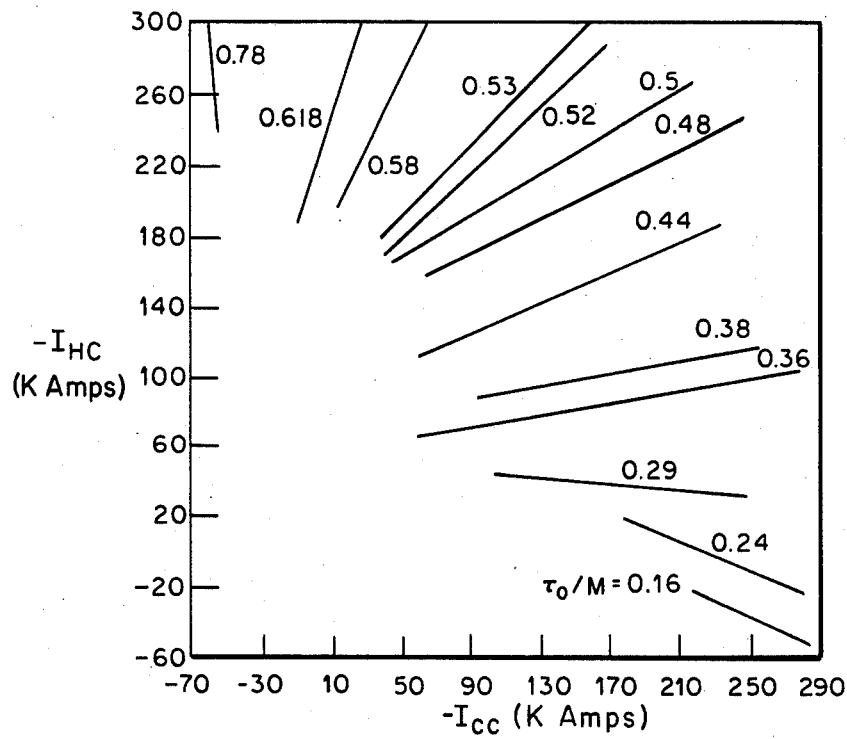
FIG. 3 is a plot of configuration space accessible to the flexible heliac shown in FIG. 1. $I_{hc}$ and $I_{cc}$ are the currents in the helical (11) and and circular (9) hardcore windings, respectively.

FIG. 3 illustrates the degree of configuration flexibility that results from the addition of the $l=1$ helical winding 11 to the hardcore coil assembly 7. The ranges of circular ($I_{cc}$) and helical ($I_{hc}$) currents shown correspond to the currents that may be attained with a hardcore current density of 10 kA/cm$^2$. Each of the outwardly radiating lines in this "configuration space" represent a family of configurations having the same central rotational transform per field period ($\tau_o/M$). The properties of the configuration may be changed by varying the magnitude of the hardcore current components.

If the currents are changed so as to move the operating point counterclockwise in the $I_{hc}$–$I_{cc}$ plane, the rotational transform per period can be varied by a factor of approximately 5, from $\tau_o/M=0.16$ to $\tau_o/M=0.78$, passing through rotational transform resonances which tend to break-up the closed magnetic surfaces (the strongest of which are low-order rationals like $\frac{1}{3}$, $\frac{1}{2}$, etc.) along the way. FIG. 4 shows magnetic surfaces for three configurations having different rotational transforms per period. The relative sizes of the hardcore conductors 9 and 11 illustrate the relative currents flowing in the conductors to produce the particular configuration. Note that in the $\tau_o/M=0.24$ case, the current in the helical conductor 11 is reversed to that in the circular conductor 9 as indicated by the solid dot. All of the transform profiles have low shear, with most of the radial variation in transform occurring near the plasma edge.

Thus, it will be seen that it is possible to change the rotational transform from just above the range of approximately 0.1 that is characteristic of the major stellarator-type devices now operating to large values greater than approximately 0.3 that are attractive for high beta (>10%) helical-axis stellarators.

If instead, the hardcore current components are varied so as to move along a line of constant $\tau_o/M$, other properties of the configuration change. As the circular hardcore current is increased, the helical hardcore current must be changed so as to keep the central transform constant. The helical swing radius of the magnetic axis of the flux surfaces about the hardcore and the plasma minor radius increase with increasing hardcore currents. The average radius of the last closed flux surface is influenced not only by the systematic variation of the helical swing radius of the magnetic axis, but also by the proximity of low-order resonances ($\tau/M=\frac{1}{3}$, $\frac{1}{2}$, etc.) to the edge of the configuration. As the rotational transform is raised closer to a major resonance, the edge flux surfaces tend to break up, and the confined plasma radius is reduced. The average plasma minor radii that can be achieved in the example of FIG. 1 range from 10 to 25 cm, corresponding to aspect ratios (R/ā) in the range of from 6 to 15 where ā is the average radius of the confined plasma.

The magnetic well-depth, which is determined by the radial profile of $$V' = \lim_{N \to \infty} \int \frac{dL}{B}$$

Figure 5:
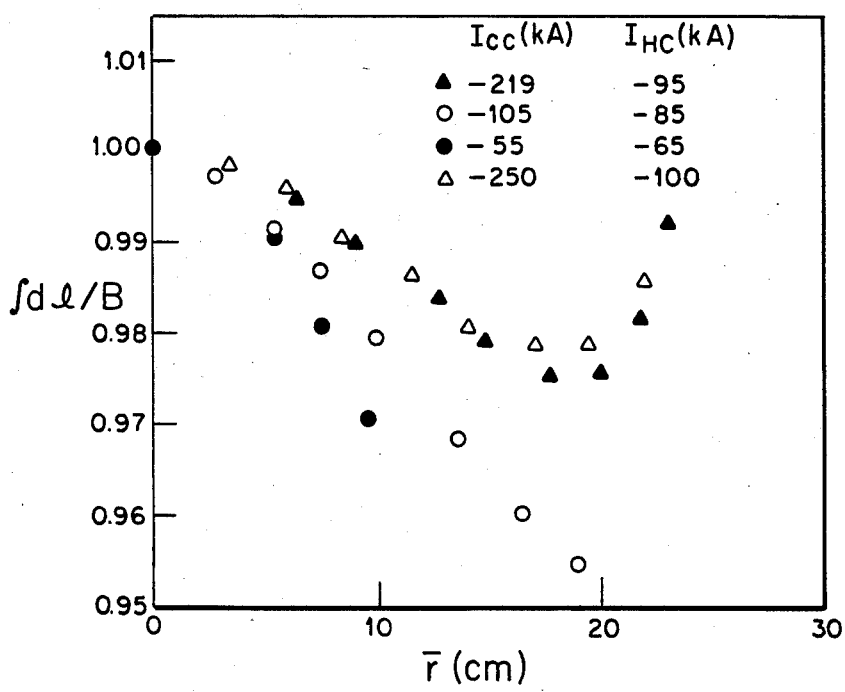
FIG. 5 is a graph of radial profiles of V' for configurations along the $\tau_o/M=0.36$ line of FIG. 3.

(where dL is taken along a field line, and N is the number of toroidal transitions which the integration is carried out, B is the magnetic field strength and L is toroidal distance), also changes as the mix of helical and circular hardcore currents is varied. FIG. 5 shows V' profiles for configurations along the $\tau/M=0.38$ line of FIG. 3. As the hardcore currents are increased, the magnetic well-depth $V'=V'(0)-\min[V'(r)]$ decreases by a factor of approximately 2. This trend is evident throughout the accessible configuration space, and follows from the increase in helical axis swing radius that accompanies an increase in the hardcore currents. The cases with the largest currents actually have a destabilizing magnetic hill (i.e., V' increases with minor radius) near the plasma edge, as shown in FIG. 5.

Figure 6:
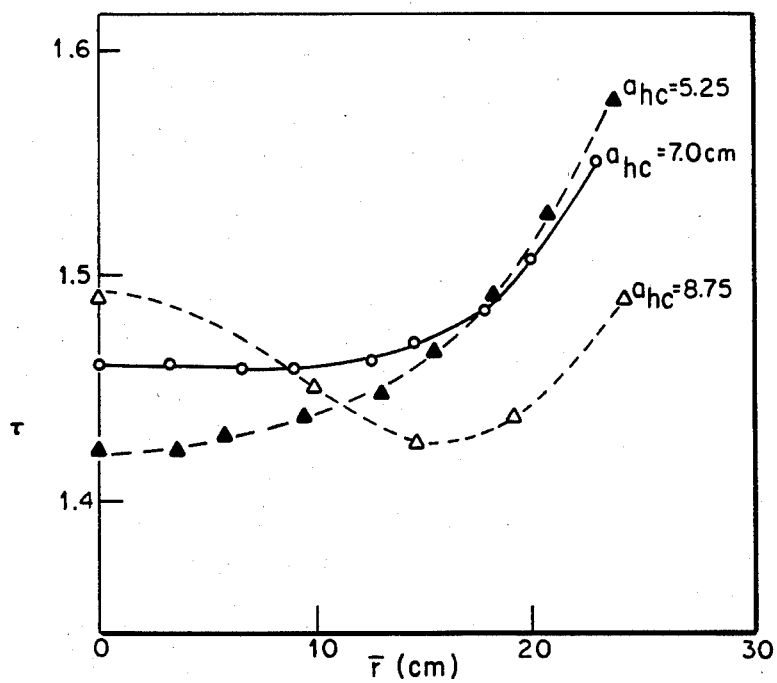
FIG. 6 is a plot of rotational transform profiles ($\tau$) for configurations obtained when the minor radius of the centroid of the helical hardcore winding is varied. The values of the hardcore currents for each case of this example are.

The configuration variations that have already been discussed have the additional effect of varying the shear $d\tau/dr$ somewhat, but are really more directed at the avoidance of resonances. More significant variations in shear can be realized through careful design of the helical hardcore windings. If they are arranged in layers that can be separately powered, it is possible to change the effective minor radius of the centroid of the helical winding. FIG. 6 shows rotational transform profiles for three configurations that were realized by redistributing the current in the helical winding layers of the configuration of FIG. 1. The magnitudes of the circular and helical hardcore currents were adjusted to give comparable central rotational transforms. As the plots show, the rotational transform profile can be changed from one that increases monotonically with minor radius to one with a central peak.

As shown in FIG. 1, a set of outboard vertical field coils (13 and 15) is required to position the magnetic surfaces with respect to the hardcore. In fact, the flux surface size and magnetic well are slightly improved if the VF coil currents are set so that the magnetic surfaces are shifted outward in R by a small distance (typically about 1% of the major radius) relative to the "helically centered" position. Small variations in configuration properties (rotational transform, magnetic well) can be achieved by varying the major radial positioning of the flux surfaces, but these changes are limited in magnitude by the need to maintain reasonable separation of the plasma and the hardcore assembly and are not a significant factor in configuration flexibility.

The various parameters for a particular flexible heliac design may be optimized based on systematic configuration scans within the constraints established for the device, i.e., major radius, average plasma minor radius $\bar{a}$ and the toroidal field strength B. The appropriate $\tau/M$ is selected for the particular beta desired.

The effect of varying the number of field periods M can be determined using configuration scans in which either (1) the coil aspect ratio $R/a_c$ is held constant while M is varied, or (2) the "pitch" $Ma_c/R$ is held constant while both M and $R/a_c$ are changed. In studies of configurations similar to that of FIG. 1, the results of both scans show that, for fixed R (i.e., fixed gross device size), the average plasma radius $\bar{a}$ decreases as M is increased. For the constant pitch scan, the finite-beta equilibrium properties improve with increasing M and $R/a_c$: specifically, the toroidal (outward in R) Shafranov shift at finite $/\beta$ decreases.

The configuration properties depend weakly on the number of TF coils per field period (N/M) as long as $N/M \geq 6-7$. Flux surface quality improves with increasing N/M as does the magnetic well depth. The magnetic field ripple due to the finite number of TF coils also decreases with increasing N/M. The configuration choice of M=4 and N/M=8 coils per period for the device illustrated herein with R=1.5 m, $\bar{a}$ 15 cm, and B=1 Tesla reflects a compromise between good access for heating and diagnostics and attractive magnetic configuration properties.

The effects of varying the TF coil radius ($a_c$) with the other physical parameters held fixed have also been studied for the illustrated design. For coil radii less than 40 cm the plasma comes too close to the inner surface of the TF coils to allow sufficient clearance, and for coil radii much over 40 cm there is no net increase in plasma minor radius because of the onset of external magnetic islands. With the final value $a_c$=40 cm selected for the design, the base configuration with $\tau_o$=1.46 ($\tau_o/M$=0.365, i.e., between the resonances at $\frac{1}{3}$ and $\frac{2}{5}$) has a plasma aspect ratio $R/\bar{a} \simeq 7.7$.

The minor radius ($a_{hc}$) of the helical hardcore winding 11 influences the mechanical design of the hardcore assembly, the maximum hardcore currents that can be used, and the clearance between the plasma and the hardcore. The design value $a_{hc}$=7 cm provides sufficient conductor cross section and adequate plasma clearance, although a limiter must be used for some of the magnetic configurations.

Maintaining adequate clearance between the plasma and the coils is an important design consideration that can affect the range of configurations that can be actually achieved. The distance between the plasma and the surface of the hardcore is the most sensitive to configuration variations.

FIG. 7 shows the distance (d) from each magnetic surface labeled by its average radius, $\bar{r}$, to the center of the helical hardcore winding for configurations having different values of $\tau_o/M$. The design value for the cross-sectional radius of the helical winding is 3.5 cm, so surfaces with a spacing to the helical winding center $\leq 3.5$ cm must be eliminated with a material limiter. For the case with $\tau_o/M$=0.36, a limiter that intercepts the magnetic surface having an average radius of 20 cm provides 1 cm of clearance between the plasma edge and the surface of the helical winding case. This clearance can be increased by a deeper insertion of the limiter, at a rate of 1 cm of clearance for each decrease of 2 cm in average plasma radius.

There are several other ways to increase the clearance to the hardcore winding. If higher hardcore currents are used to obtain the same $\tau_o/M$, the clearance can be increased while maintaining a larger plasma size. Another method which looks very promising is to "spread out" the helical winding turns in the poloidal direction, yielding an increase in the clearance of 2.5 cm for flux surfaces having the same average radii.

Referring now to FIG. 8, there is shown a cross-sectional view of one design of a composite hardcore conductor 7 in which the circular hardcore winding is formed of triangular cross section, copper conductors 21 enclosed in a stainless steel tube 23 and the helical hardcore winding is formed by winding multiple layers of rectangular cross section, copper conductors 25 in a stainless steel channel formed by radially extending side walls 27 and 29 which are welded to the tube 23 to form a helical channel about the tube. The conductors of both windings may be electrically insulated by coating each conductor with an insulating material such as a polyamide film (Kapton) or an epoxy-fiberglass composite. The channel is covered by a stainless steel cap 31 which is welded to the side walls 27 and 29 after the helical winding is completed. Cooling channels 33 and 35 are provided in the conductors 21 and 25, respectively, to allow passage of cooling water through the assembled conductors. The stainless steel encasement of the conductors is necessary to shield the conductors from the plasma. The current leads to the windings and coolant leads (not shown) are preferably positioned 90° apart toroidally. Separate currents may be fed to the separate winding layers of the helical conductor so that the currents in the layers may be varied in a manner which effectively changes the spacing between the circular and helical conductors of the hardcore assembly to provide this additional degree of flexibility as pointed out above. The hardcore assembly may be supported within the torus by means of stainless steel structural supports (not shown) which extend between TF coils and through a vacuum casing which may be either inside or outside of the TF coils as will now be described.

The vacuum vessel for the device may take various forms. Alternate embodiments are shown in FIGS. 9 and 10 for vacuum vessels internal and external, respectively, to the TF coils 5. Referring now to FIG. 9, a vacuum vessel is shown in which the TF coils 5 are formed on the outside of cylindrical base plates 37 (only one of which is shown) which join adjacent oblong housing segments 39. The vessel is composed of 32 segments, corresponding to the 32 TF coils, which are assembled to follow the helical path of the TF coils. These housing segments are divided into four groups having different toroidal sector widths so that they fit together to form the helical torus. The central hardcore composite winding 7 is disposed within the vacuum housing.

Referring now to FIG. 10, there is shown an exterior vacuum vessel embodiment which for the illustrated heliac design consists of two concentric cylinders 41 and 43 of major radii 0.7 m and 2.3 m, respectively, a base plate 45 and a removable cover plate 47. The structure forms a toroidal housing of rectangular cross section which encloses the TF coils 5 as well as the central hardcore assembly 7 in a vacuum environment. Both the TF coils and the hardcore assembly must be encased in stainless steel in this case due to their exposure to the plasma. In this embodiment, the vertical field coils 13 and 15 may be mounted on the outside of and supported by the vessel.

Thus, it will be seen that an improved helical-axis stellarator has been provided which introduces flexibility in control of the magnetic field rotational transform profile and shear while deepening the magnetic well by the addition of an $l=1$ helical winding to the central hardcore conductor. The shear can be controlled to produce a nearly shearless configuration. This added flexibility in control provides 3-D MHD equilibrium by avoiding low-order magnetic surface resonances that can limit the achievable beta to low values. Equilibrium studies using previously developed computer codes NEAR and BETA for stellarator designs have shown that good equilibria exists for finite beta values up to at least 8%. With further refinements to the numerics and to the $\tau/M$ ranges chosen, it is believed that this value can be exceeded. It should be noted that the flexible heliac according to this invention can have a magnetic well ($V'' < 0$) over all or most of the confinement volume, thus satisfying a basic requirement for ideal stability.

We claim:

1. In a helical-axis stellarator of the type including a planar circular central winding, a plurality of planar toroidal magnetic field generating coils disposed about said central winding whose centers are located on a helical axis twisting about and spaced from said central winding to form a toroidal helix having M toroidal periods in which a helical axis plasma is magnetically confined, the improvement comprising:

an $l=1$ helical winding, where l is the toroidal winding multiplicity, disposed to spiral about and encompass said planar circular central winding one revolution for each period of said toroidal helix in close proximity to said central winding and in phase with said helical axis of said plurality of toroidal magnetic field generating coils so that currents in said helical winding and said central winding may be separately varied to control the rotational transform, $\tau$, of closed magnetic flux surfaces which confine said helical axis plasma for stably confining said plasma at finite beta values, said helical winding including a plurality of separate winding layers disposed radially outward from said central winding so that separate currents may be applied to said plurality of separate layers of said $l=1$ helical winding to effectively vary the radial space relationship of the effective center of said $l=1$ helical winding relative to said central winding thereby varying the shear of said magnetic flux surfaces.

2. The improvement of claim 1 wherein said closed magnetic flux surfaces are generally bean-shaped in cross section and spiral about said central winding and wherein said $l=1$ winding is disposed between the indented surfaces of said bean-shaped magnetic flux surfaces and said central winding.

* * * * *